2,970,895

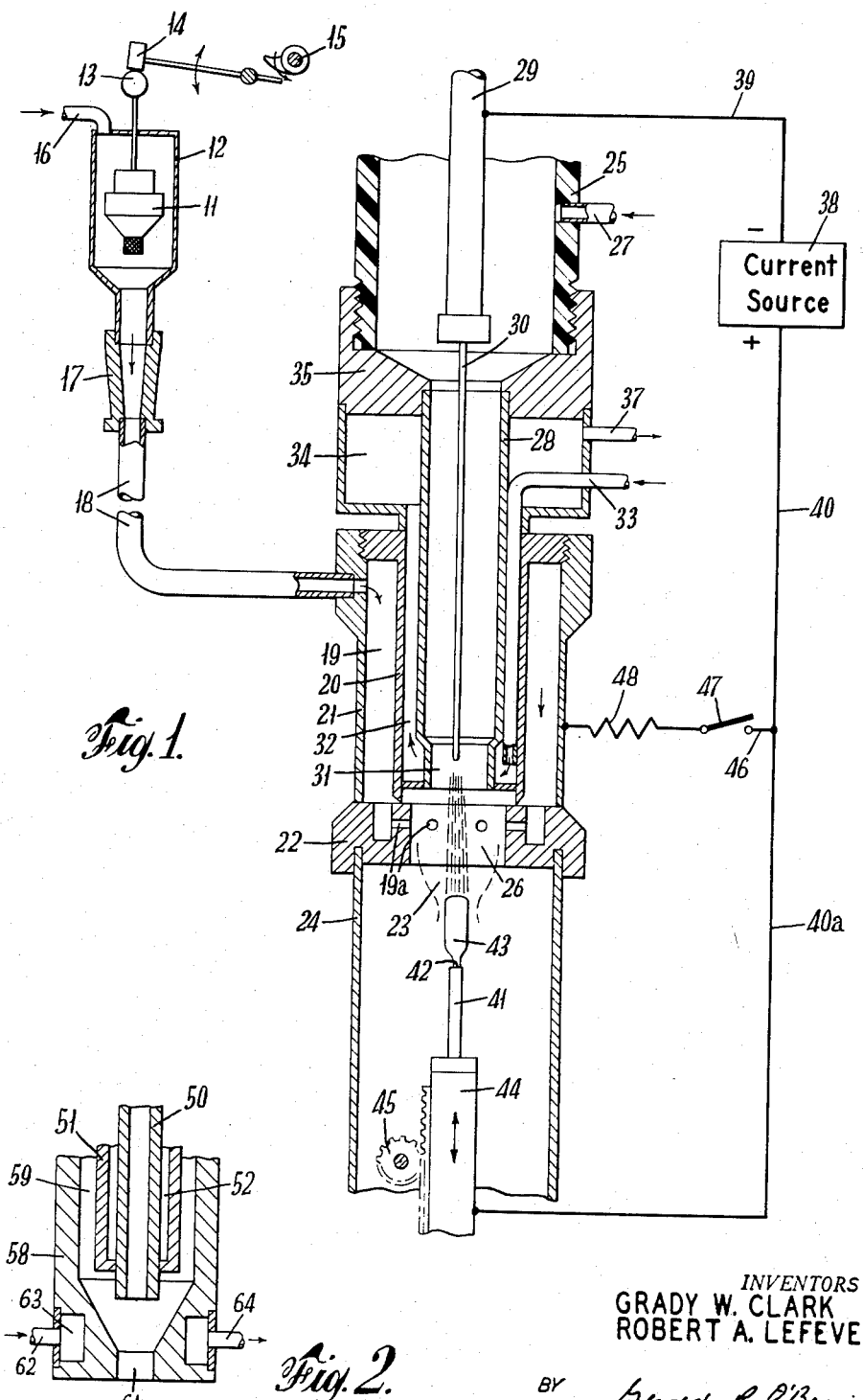
INVENTORS
GRADY W. CLARK
ROBERT A. LEFEVER

PROCESS FOR CRYSTALLINE GROWTH EMPLOYING COLLIMATED ELECTRICAL ENERGY

Grady W. Clark, Richmond, and Robert A. Lefever, Bon Air, Va., assignors to Union Carbide Corporation, a corporation of New York Filed Dec. 31, 1956, Ser. No. 631,565

4 Claims. (Cl. 23—301)

The present invention relates to novel process for growing crystalline boules employing collimated electrical energy, and more particularly, to such process for growing crystalline boules of elemental metals, metal oxides, metal salts, or mixtures thereof.

Various crystalline boule materials have been grown for many years by the well-known Verneuil process (as disclosed in the United States Patent No. 988,230) in which powdered feed constituents are introduced in the boule-growing zone where such constituents are heated and melted by an oxy-hydrogen flame. The molten matrial drops onto a support rod where it adheres and grows into a boule, and the support rod is gradually lowered away from the oxy-hydrogen flame so that only the growing surface of the boule is maintained in the molten state. One improvemnt over the Verneuil process involves the use of an auxiliary electric arc between an electrode and the boule support to supply additional heat to the combustion gases from the oxy-hydrogen flame. These known processes employing combustion reactions are limited to the growth of boules having compositions compatible with the chemical reactions occurring in the combustion flame. For example, a process using an oxy-hydrogen flame is not satisfactory for growth of boules containing elemental metals such as nickel, cobalt and silicon, as the ever-present oxygen reacts with the metal to form metal oxides which deleteriously contaminate the desired elemental metal in the boule.

Another disadvantage of the original Verneuil process is its limitations in control of heat input to the boule-growing surface. The temperature in the boule-growing zone is determined by the hydrogen-oxygen ratio and since this ratio can only be varied over a retalively narrow range, the temperature control is thus restricted. Furthermore, the heat input is also limited to the maximum temperature attainable with combustion reactions.

Another disadvantage of the original Verneuil process is its limitation to feed constituents in the powdered solid stage.

Principal objects of this invention are: to provide an improved process for growing crystalline boules from feed constituents with complete control of the enveloping gas and thus control over the chemical composition of the boule, to provide a process wherein improved heat control and higher heating temperatures are obtained, and to provide a process utilizing either gaseous or solid feed constituents for such boule growing. Other objects will become apparent from the ensuing disclosure and appended claims.

In U.S. Patent 2,806,124, issued September 10, 1957, to R. M. Gage, and entitled "Arc Torch and Process," there is described a method and apparatus for collimating an electric arc to form a "high pressure" electric arc having a higher cross-sectional energy density than arcs theretofore encountered. The term "high pressure" arc, as used herein, is discussed (pages 290 and 326) by Cobine in his book, "Gaseous Conductors," published in 1941 by McGraw-Hill and is to be understood as relating to self-sustaining gas discharges in the general pressure range above $\frac{1}{20}$ atmosphere and generally in the current range of a few to thousands of amperes.

In accordance with one aspect of the present invention, a process for growing crystalline boules from feed constituents is provided in which an electric arc is established between a stick electrode and a second electrode positioned therefrom. Concurrently, a gas stream is passed in intimate contact with the stick electrode to envelop or contain the arc, and the arc-containing gas stream is constricted through an orifice to collimate the arc energy and the gas stream as well as to produce a high-pressure arc and a high thermal content effluent. The latter is passed to a boule-growing zone to heat a boule-growing surface positioned with the zone, and the feed constituents are also passed to the boule-growing zone for heating and production of boule-growing material therefrom. A crystalline boule of increasing size is formed by fusing and accumulating the boule-growing material on the boule-growing surface. If an electrically conductive boule is to be grown, a pilot arc may be initiated between the stick electrode and the second electrode, and then a primary arc is initiated between the stick electrode and the boule support rod. The primary arc transfers from the support rod to the boule itself after boule growth is initiated.

The phrase "electrically conductive boule" used hereinafter refers to a boule grown from material which is electrically conductive when heated, but not necessarily electrically conductive at room temperature, for example, elemental metal silicon. Also, "boule-growing surface" refers to the surface on the top of a boule-support rod on which the boule is grown. If a seed crystal is used, such crystal constitutes the boule-growing surface during the initial growth period. If a seed crystal is not used, the top of the boule-support rod itself is the boule-growing surface during the initial growth period. As growth progresses, the molten cap of the boule becomes the boule-growing surface in either case.

The sole source of heat for the boule-growing process of the present invention is electrical energy. If the growing boule is not part of the electrical circuit, electric energy in the form of an electric arc heats a gas stream which in turn heats the boule-growing surface. If the growing boule is electrically conductive, the boule may form part of the electric circuit and heat is supplied to the boule-growing surface in two ways, indirectly by the arc-containing gas stream or hot effluent and directly by the electric arc. These arrangements permit the supply of exactly the quantity of heat required for growth of a specified boule by suitable adjustment of the process variables. By regulating the electric current and the heating gas flow rate, the temperature of the boule-growing surface may be raised or lowered at will. The present invention provides a simple, yet efficient, method for controlling the temperature of the boule-growing process and provides a method for maintaining the desired temperature level by supplying heat from a single source, electrical energy. Since an electric arc produces extremely high temperatures, this process has a higher upper temperature limit than the prior art processes limited to combustion reactions.

Since at least part of the heat for the boule-growing process of the present invention is provided by heating a gas stream by means of electrical energy and transferring this heat from the gas stream to the feed constituents, any gas may be used providing it will support an arc and does not deleteriously effect the feed constituents. For example, if a silicon metal boule is desired, an inert gas such as argon may be used to heat the silicon powder feed constituent. The argon gas stream serves to transfer heat to the silicon powder feed constituent, and does not react with the silicon.

Another characteristic of this novel process is flexibility in selection of the physical state of the feed constituents. Since an inert gas may be used to heat the feed constituents the latter may be provided in the gaseous state without fear of reaction with the heating gas. For example, an elemental metal silicon boule may be grown from gaseous silane feed constituent using an inert gas such as argon as the heating medium.

The feed constituent may be introduced directly into the boule-growing zone, may be passed through the orifice with the arc-containing gas stream before entering the boule-growing zone, or may be introduced into the boule-growing zone in any other suitable manner.

The invention will be described in detail hereinafter with reference to the accompanying drawings wherein:

Fig. 1 is a schematic electrical circuit diagram and vertical midsectional view, parts being in elevation, showing a boule-in-circuit embodiment of novel apparatus for growing an electrically-conductive crystalline boule by the process of the invention, wherein the feed constituents are introduced downstream from the orifice and above the boule-growing zone; and Fig. 2 is a partial, vertical midsectional view, parts being in elevation, showing another embodiment of the novel arc-torch apparatus for growing a crystalline boule by the process of the invention, wherein the feed constituents pass through a hollow stick electrode and the orifice before entering the boule-growing zone.

More specifically in accordance with the invention, feed constituent powder, for example, silicon metal, is placed in a basket screen 11 within a hopper 12. Powder is periodically sifted out of the screen by intermittently striking an anvil 13 which projects from the top of the screen to the outside of the hopper 12, with a pivoted hammer 14 actuated by a rotating cam 15. A carrier gas stream unreactive with the silicon powder, for example, argon, enters the hopper 12 through conduit 16 and carries the powder through a conduit adapter 17 and conduit 18 into annular feed constituent passage 19 formed between the lower casing 20 and outer concentrically positioned housing 21, the latter two components being leak tightly connected at their upper ends by a threaded joint.

The powdered silicon in the argon carrier gas stream is injected from the feed constituent passage 19 through multiple horizontal passageways 19a into center annulus 26 in the chamber header 22. The powder is then carried by hot effluent gas to the boule-growing zone 23 in the closed chamber 24. The multiple horizontal passageways 19a are preferably drilled at equal distances around the circumference of the chamber header 22, for example as shown in Fig. 1, six passageways may be spaced at 60 degree intervals.

The heating gas, for example, argon, enters the upper casing 25 through conduit 27 and passes as a stream into the arc nozzle 28 which is axially aligned in the lower casing 20 and comprises one electrode. An electrode holder 29 is axially aligned inside the upper casing 25 and a stick electrode 30, preferably composed of thoriated tungsten or the like, projects from the lower end of the electrode holder 29 into the nozzle 28. The discharge portion of the nozzle 28 tapers to form a constricted outlet or orifice 31 of relatively reduced diameter. The outer wall of the nozzle 28 and the inner wall of the lower casing 20 are spaced to provide an annular coolant passage 32 for the circulation of coolant, e.g. water, around the nozzle 28 to prevent overheating. The coolant is fed through conduit 33 to annular passage 32 and then to a coolant reservoir 34 which is axially positioned around the upper part of the nozzle 28 and is leak-tightly metal bonded to the lower casing 20. The conduit 33 extends from the coolant reservoir 34 to the annular passage 32 and the water emerging from conduit 33 circulates around the lower part of the nozzle 28 before rising into the coolant reservoir 34 where it cools the upper part of the nozzle 28 and is discharged through conduit 37. The upper end of the coolant reservoir 34 is sealed off against the bottom side of connector 35, and the upper casing 25 is leak tightly attached to the top of connector 35 by, for example, a threaded connection.

The argon gas in the nozzle 28 passes in intimate contact with, and around the stick electrode to envelop or contain the arc. The arc-containing gas is constricted through the orifice 31 to collimate the arc energy and the gas stream as well as to produce a high-pressure arc and a high thermal content effluent. As previously discussed the silicon powder is ejected from horizontal passageways 19a into the effluent as the latter passes through center annulus 26 of the chamber header 22, and is carried onto the boule-growing surface in zone 23. This arrangement provides a remarkably high rate of heat generation in the effluent, which in turn heats the powder feed to produce boule-growing material and also maintains a molten boule-growing surface in zone 23. This material falls through the downwardly flowing hot argon effluent and is fused and accumulated on the upper end of a vertical boule support rod 41 on top of which a seed crystal 42 is placed. Additional heat is supplied to the boule-growing surface by electric power as the support rod 41 and seed crystal 42 are part of the electric circuit. As the fusing material accumulates, progressive crystallization is induced to form a boule 43 having the same crystallographic orientation as the seed crystal 42 by gradually lowering the boule support rod 41 vertically downwardly away from the boule-growing zone 23 to maintain the proper temperature gradient through the molten cap of the boule. If a particular crystallographic orientation is not required, the seed crystal 42 is not necessary. Any suitable lowering mechanism can be used, such as vertical pedestal 44 in meshed-gear relationship with horizontally rotating member 45. If desired, the pedestal 44 may be horizontally rotated for greater assurance of uniform boule growth around the vertical axis (horizontally rotating means not shown). It is to be understood that the process variables such as heat input and the boule position may be adjusted in a manner well-known to those skilled in the art.

If an elemental metal boule is to be grown, the chamber 24 is preferably sealed from the atmosphere to avoid oxidation. Even if the boule is to be a metal oxide or metal salt, the use of a sealed chamber is desirable as it minimizes dissipation of heat from the boule-growing zone 23, helps to maintain the desired temperature gradient across the molten boule cap, and avoids misdirection of the falling boule-growing material away from the boule support rod 41 by air currents circulating transversely across the boule-growing zone 23. A sealed chamber also permits operation at pressures above or below atmospheric pressures if these conditions are found desirable.

The stick electrode 30 is connected to the negative side of a direct current source 38 through the electrically conductive electrode holder 29 by lead 39, while the positive side of such source is connected to the electrically conductive pedestal 44 by leads 40 and 40a. The electrically conductive housing 21 and nozzle 28, preferably composed of copper, are also connected to the positive side of direct current source 38 by branch lead 46 which include open circuit switch 47 and ballast resistor 48. The latter consists of a lamp or a bank of lamps to limit the amount of current to that which is sufficient to maintain a pilot arc between the nozzle orifice 31 and stick electrode 30. The circuit operates as follows:

First the switch 47 is closed to place the nozzle 28 in the circuit. Then a pilot arc is initiated between the nozzle orifice 31 and the stick electrode 30. After the gas passing through the nozzle 28 has heated the boule-growing surface in zone 23 and the boule support rod 41 sufficiently, a primary arc is established between the stick electrode 30 and support rod 41. At this point, switch 47 may be opened to remove the nozzle 28 from the circuit. As the boule 43 is grown, it replaces the support rod 41 as a primary electrode and the primary arc is between stick electrode 30 and boule 43.

Instead of injecting the feed constituents into the hot effluent gas downstream of the orifice 31, such constituents may be introduced through conduit 18 to conduit 27 and hence to the upper casing 25 for passage through the entire length of nozzle 28, orifice 31, and finally into the boule-growing zone 23. One advantage of such an arrangement is increased efficiency in heat transfer from the arc-containing gas to the feed constituents. This is due to the intimate contact between the gas and the feed constituents as they pass simultaneously through the orifice 31.

Although intermittent introduction of the feed constituents has been described and illustrated, the process and apparatus of the present invention is adaptable to continuous introduction of the feed constituents. This could be achieved, for example, by introducing such feed through conduit 16.

Furthermore, if the presence of an active gas such as oxygen does not deleteriously effect the particular boule to be grown, such gas could be used in the system providing it does not contact the tungsten stick electrode 30 and produce corrosion thereof. This can be avoided, for example, by surrounding the stick electrode 30 with a shield and passing inert gas inside the shield to envelop the stick electrode.

Fig. 2 illustrates a stick electrode, nozzle, and orifice assembly in which a hollow stick electrode is used instead of a solid stick electrode. The feed constituents enter the assembly through the hollow stick electrode 50 which is partially surrounded by the lower casing 51 thereby providing annular coolant passage 52 between the lower casing 51 and the outer walls of the hollow stick electrode 50. Nozzle 58 is concentrically positioned around the lower casing 51, and the gas stream enters through the annular passage 59 between the nozzle 58 and the outer walls of the lower casing 51. The gas stream and the feed constituents converge at the outlet end of the stick electrode and the arc is enveloped or contained by the gas stream before constriction through orifice 61 in the lower end of the nozzle 58 to collimate the arc energy and the gas stream as well as to produce a high-pressure arc and a high thermal content effluent. The effluent is further processed in the predescribed manner. The lower end of the nozzle 58 is cooled by introducing cold fluid from inlet conduit 62 into the annular space 63, such fluid being discharged through outlet conduit 64.

The apparatus in Figures 1 and 2 is adaptable to employment of feed constituents in the gaseous state. In such case, the feed constituent gas, preferably diluted by a non-reactive carrier gas such as argon, may be introduced into the hopper 12 through the feed conduit 16 (Figure 1), or alternatively may be introduced through conduit 27 into the upper casing 25 and hence to nozzle 28. In either case, the feed constituent gas is heated to its decomposition temperature whereupon elemental metal is formed and deposited upon the boule support rod to facilitate growth of a crystalline boule.

Although the invention has been described in terms of direct current-straight polarity operation (nozzle positive), direct current-reverse polarity operation (stick electrode positive) is also applicable. Furthermore, alternating current with or without superimposed high-frequency is also practicable.

The unique advantages of the present invention may be further illustrated by the following tests which were successfully performed.

EXAMPLE I

*Growth of silicon boule from silicon powder (boule-in-circuit)*

An arc torch similar to that shown in the embodiment of Figure 1 was constructed comprising a 1/16-inch diameter solid tungsten stick cathode positioned within a 1/4-inch diameter water-cooled copper nozzle anode. An electrically conductive iron boule support rod was also connected to the anode side of the power supply. A ballast resistance of 2–1000 watt lamps was connected between the nozzle and the support rod, and a switch was included in the circuit to electrically disconnect the nozzle after initiation of the primary arc. A powder feed device was positioned coaxially below the orifice and connected to a feed constituent powder hopper. A carrier gas supply conduit as well as a mechanical tapper to pulse powder down through the feed device were connected to the powder hopper. To protect the growing boule from oxygen, the entire boule-growing zone beneath the torch was sealed off from the atmosphere by a 2½ inch diameter silica glass tube.

A pilot arc was initiated between the tungsten stick cathode and the nozzle anode, and after the boule-growing surface was heated sufficiently, the primary arc was initiated and the support rod became a primary electrode. The arc torch was operated at 12 amperes and 60 volts (D.C.S.P.) and a 50 volume percent argon–50 volume percent helium gas stream was passed down through the nozzle and constricting orifice into the boule-growing zone at 4 liters per minute. A silicon powder feed (250–325 mesh) was introduced at about 12 pulses per minute into an argon carrier gas stream of about 2 liters per minute. The powder feed entered the boule-growing zone beneath the nozzle outlet whereupon the silicon fused and accumulated on the support rod to form a silicon boule. The boule support rod was rotated at about 12 r.p.m. so as to form a more evenly shaped boule. After initiation of boule growth, the primary arc transferred from the boule support rod to the growing boule itself, and the latter became a primary electrode since silicon metal is electrically conductive at elevated temperatures.

EXAMPLE II

*Growth of silicon boule from silicon powder (boule-in-circuit and alternating current)*

An arc torch similar to that used in Example I (see Figure 1) was employed in this experiment except that an alternating current power supply was connected between the tungsten cathode and the support rod. A high-frequency starter was continuously used to maintain the arc. The torch was operated at 8–13 amperes and 35–40 volts, and argon gas was passed down through the electric arc and out of the nozzle orifice into the boule-growing zone at 6 liters per minute. The silicon powder feed was introduced in pulses into an argon carrier gas stream of about 2–3 liters per minute, and a silicon boule was grown in the previously described manner.

EXAMPLE III

*Growth of silicon boule from silane gas (boule-in-circuit)*

An arc torch similar to that used in Example I (see Figure 1) was also used in this experiment. The arc was initiated by a high frequency starter and the torch was operated at 8–12 amperes and 30–34 volts (D.C.S.P.). Silane gas (7 volume percent in argon carrier gas) was passed down through the torch nozzle at 4 liters per minute (total argon plus silane in stream) into the boule-growing zone. Elemental silicon was deposited on the support rod indicating growth of a silicon boule from silane gas by decomposition of the gas.

What is claimed is:

1. A process for growing an electrically conductive crystalline boule from feed constituents comprising the steps of concurrently establishing an electric arc between a first electrode and a boule-growing surface positioned therefrom, passing a gas stream in intimate contact with said first electrode to contain the arc, passing the arc-containing gas stream through an orifice to collimate the arc energy and the gas stream as well as to produce a high-pressure arc and a high thermal content effluent, passing the hot effluent to a boule-growing zone and heating said boule-growing surface positioned within such zone, introducing said feed constituents in said boule-growing zone and heating such constituents by passage in the hot effluent to produce boule-growing material, and fusing and accumulating such material on said boule-growing surface as a crystalline boule of increasing size.

2. A process for growing an electrically conductive crystalline boule from powder feed constituents comprising the steps of concurrently establishing an electric arc between a first electrode and a boule-growing surface positioned therefrom, passing a gas stream in intimate contact with said first electrode to contain the arc, constricting the arc-containing gas stream to collimate the energy by forming a high-pressure arc and a high thermal content effluent, passing the hot effluent to a boule-growing zone and heating said boule-growing surface positioned within such zone, passing said powder feed constituents to said boule-growing zone by means of a carrier gas stream and heating such constituents by passage in the hot effluent to produce boule-growing material, and fusing and accumulating such material on said boule-growing surface as a crystalline boule of increasing size.

3. A process for growing an electrically conductive elemental metal crystalline boule from gaseous feed constituents thermally decomposable to an elemental metal comprising the steps of concurrently establishing an electric arc between a first electrode and a boule-growing surface positioned therefrom, passing a gas stream in intimate contact with said first electrode to contain the arc, constricting the arc-containing gas stream to collimate the energy by forming a high-pressure arc and a high thermal content effluent, passing the hot effluent to a boule-growing zone and heating said boule-growing surface positioned within such zone, passing a gaseous feed constituent stream to said boule-growing zone and in said high-thermal content effluent for heating and thermal decomposition to form elemental metal, and fusing and accumulating such metal on said boule-growing surface as an elemental metal crystalline boule of increasing size.

4. A process for growing an electrically conductive crystalline boule from feed constituents comprising the steps of establishing a pilot electric arc between a first electrode and a second electrode positioned therefrom, establishing a primary electric arc between said first electrode and a boule support rod in a boule-growing zone, passing a gas stream in intimate contact with said first electrode to contain the arcs, constricting the arc-containing gas stream to collimate the energy by forming a high-pressure arc and a high thermal content effluent, passing the hot effluent to said boule-growing zone and heating a boule-growing surface positioned within such zone, introducing said feed constituents in said boule-growing zone and heating such constituents by passage in the hot effluent to produce boule-growing material, fusing and accumulating such material on said boule-growing surface as a crystalline boule of increasing size and transferring the primary arc from the boule support rod to the growing boule.

References Cited in the file of this patent

UNITED STATES PATENTS

| | | |
|---|---|---|
| 988,230 | Verneuil | Mar. 28, 1911 |
| 1,529,943 | Rouvre | Mar. 17, 1925 |
| 1,587,197 | Southgate | June 1, 1926 |
| 2,011,872 | Rava | Aug. 20, 1935 |
| 2,591,561 | Lester et al. | Apr. 1, 1952 |
| 2,634,554 | Barnes | Apr. 14, 1953 |
| 2,690,062 | Burdick et al. | Sept. 28, 1954 |
| 2,692,456 | Dauncey | Oct. 26, 1954 |
| 2,697,308 | Dauncey et al. | Dec. 21, 1954 |
| 2,792,287 | Moore et al. | May 14, 1957 |
| 2,852,890 | Drost et al. | Sept. 23, 1958 |

FOREIGN PATENTS

| | | |
|---|---|---|
| 158,179 | Switzerland | Nov. 15, 1932 |